United States Patent Office 2,911,222
Patented Nov. 3, 1959

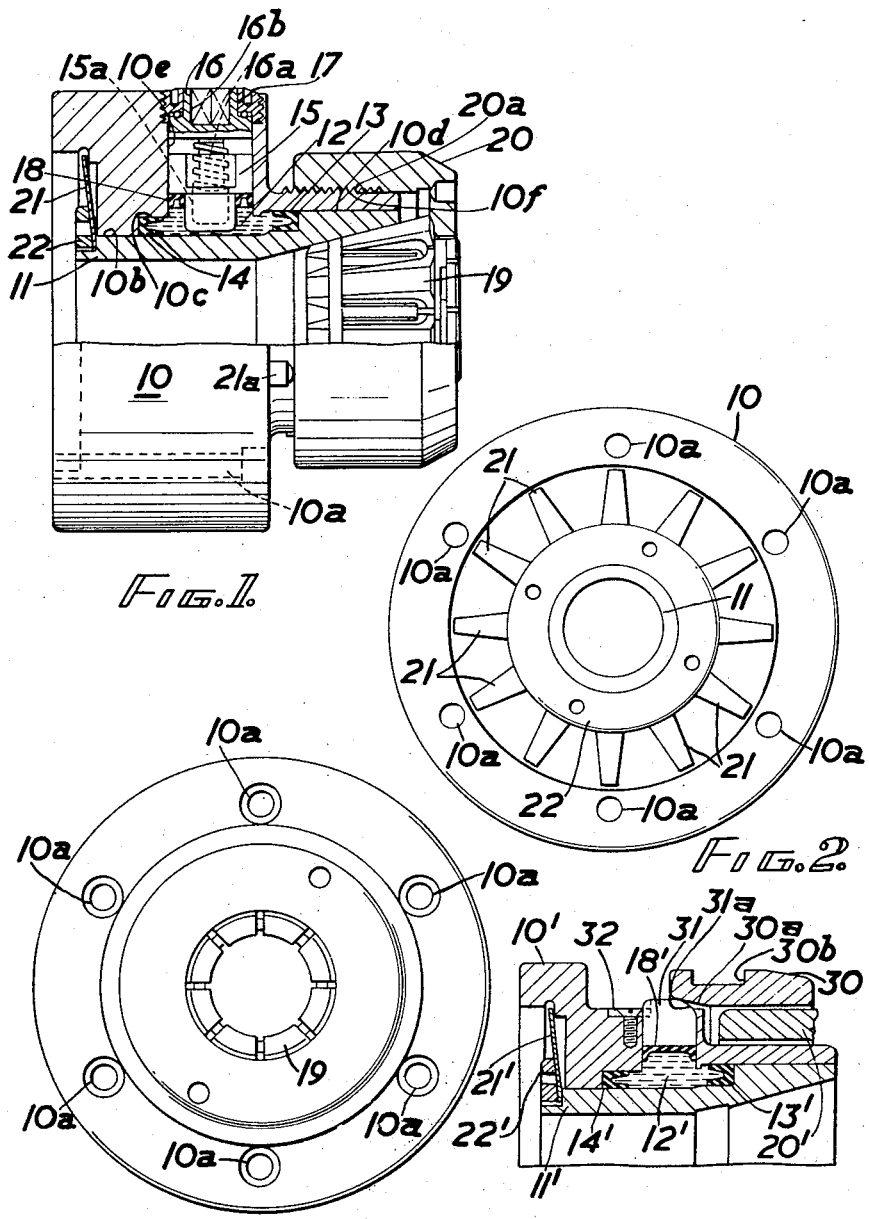

2,911,222

COLLET CHUCKS

Leonard Frank Eve, Burford, England, assignor to Crawford Collets Limited, Witney, England, a British company Application December 9, 1957, Serial No. 701,487

8 Claims. (Cl. 279—4)

This invention relates to collet chucks.

Whilst chucks according to the present invention may be used with many forms of collets, one particular application of the chucks is for use with collets whose bore can be varied over a relatively wide diameter, for example collets of the kind described in U.S. Patent No. 2,817,535.

According to the present invention there is provided a collet chuck having a hollow sleeve which can be moved to effect relative movement between a collet having an inclined surface and another correspondingly inclined surface with which the inclined surface of the collet is in contact, the sleeve being movable in a direction parallel to the axis of rotation of the chuck by increasing the hydraulic pressure in a liquid filled chamber formed in the chuck body, and into which one or more movable plungers project, the arrangement being such that the sleeve is moved to effect closing of the collet by movement of the plunger or plungers into the chamber.

The invention also provides a collet chuck comprising a chuck body, a hollow sleeve movable within said body in a direction parallel to the axis of rotation of the chuck, said sleeve having a surface of revolution inclined to said axis and adapted to co-operate with a corresponding inclined surface of a collet whereby relative axial movement between said sleeve and said collet effects closing of the latter, a liquid chamber formed in the chuck body and communicating with said sleeve, and one or more plungers movable into and out of said chamber to vary the hydraulic pressure therein and thereby effect axial movement of said sleeve.

The invention further provides a collet chuck comprising a chuck body, a hollow sleeve movable within said body in a direction parallel to the axis of rotation of the chuck, a space bounded by said chuck body and said sleeve and adapted to form a liquid chamber, at least one plunger movable into said chamber to vary the hydraulic pressure on said sleeve for effecting axial movement of said sleeve, said latter movement being adapted to effect relative movement between a collet having an inclined surface and a corresponding inclined surface formed on said sleeve to effect closing of the collet.

In one form of the chuck the collet may be secured in the chuck against axial movement by an adjustable cap or collar which is movable relative to the axis of the chuck to effect preliminary setting of the collet, so that the collet can be closed to an extent at which it just clears the work-piece. The hydraulic pressure is then used to effect final closure and gripping of the work-piece. In this way the cap can be adjusted to set the collet for repetition work on work-pieces of similar diameter and thereafter only the plunger or plungers need to be operated for opening and closing the collet when the work-piece is changed or moved.

It will be understood that movement of the plunger or plungers may be effected in many of the ways normally used for opening and closure of chucks, for example by means of a hand key, in which case the plunger may be moved in and out under the action of a screw-thread rotated by the key. Alternatively, particularly for repetition work on capstan lathes, a cam ring or sleeve may be used, the cam ring or sleeve being moved in an axial direction to move the plunger or plungers in or out as required. Again, a cam ring rotatable about the axis of the chuck may be used, this ring being turned by means of a handle or removable tommy-bar, or a rotatable hand wheel in screw-threaded engagement with a peripheral surface of the chuck and provided with inclined cam surfaces on its inwardly facing surfaces may be used in a similar way.

Two constructions of collet chuck in accordance with this invention will now be described, by way of example only, with reference to the accompanying drawings, in which:

Figure 1 is a part sectional side elevation of the first construction of collet chuck;

Figure 2 is an end elevation of the rear face of this first construction of chuck, and Figure 3 is an end elevation of the front face of the chuck;

Figure 4 is a sectional view showing the modifications which distinguish the second construction of chuck from the first construction, the second construction being particularly adapted for repetition work. In this figure similar parts to those shown in Figures 1 to 3 are similarly referenced.

Referring firstly to Figures 1 to 3, it will be seen that in this construction the chuck comprises a chuck body 10 which is provided with six bolt holes 10a to accommodate bolts for fixing the chuck to the face plate of a lathe. The body 10 is provided with a stepped bore having three concentric portions 10b, 10c and 10d whose diameters increase successively in the forward direction. The first and third portions 10b and 10d are ground surfaces and are engaged by the outer surfaces of a hollow sleeve 11 which fits within the bore and is so shaped that its intermediate portion is not in contact with the second portions 10c of the bore, the space therebetween being adapted to form an annular part of a chamber which is filled with liquid 12, for example standard hydraulic fluid. The outer surface of the sleeve 11 is stepped to effect the change of diameter between its rear and forward portions and the surface of the step forms an annular piston area upon which the liquid in the chamber can act. The liquid chamber is sealed at the junction of the chuck body 10b and sleeve 11 by two flexible sealing members 13, 14 which are annular and of channel-shaped cross-section. The channel portion faces into the liquid chamber so that the side portions of the sealing member 13 are forced by the hydraulic pressure against the chuck body 10d and sleeve 11 respectively and the side portions of the sealing member 14 are forced against the chuck body portion 10c and sleeve 11 respectively.

The sleeve 11 is fixed against rotation relative to the chuck body 10 by the provision of a co-operating key and keyway (not shown) in these members. On its inner surface the front end of the sleeve 11 is of conical shape corresponding to the conical shape of the outer surface of the collets with which it is adapted to be used, that shown in the drawings being a variable bore collet 19 which is of the kind described in the aforesaid patent specification. The fact that the sleeve 11 is hollow enables bar stock and the like to be fed forward progressively through the collet.

The body 10 is provided with a radial hole 10e which terminates in the annular part of the fluid chamber. The hole 10e accommodates a movable plunger 15 which is internally screw-threaded at 15a to co-operate with the threaded portion 16a of a captive operating screw 16. The latter is held in place by an annular bush 17 which is secured to the chuck body 10. A square section hole 16b is provided in the operating screw 16 to receive the shank of a hand key (not shown) by which the operating screw 16 can be rotated to move the plunger 15 and thereby vary the hydraulic pressure applied to the sleeve 11. The junction of the hole 10e and the plunger 15 is sealed by an annular sealing member 18 similar to the sealing members 13, 14.

To fix the collet relative to the body 10 of the chuck and for preliminary setting-up in the manner referred to above, a cap 20 is provided which fits over the front of the chuck and is suitably apertured to permit passage of work into the collet. This cap 20 is internally threaded at 20a to engage a co-operating thread 10f on the outer surface of the front end of the chuck body 10, so that the cap 20 can be screwed sufficiently far on to the body to effect closing-up of the collet 19 due to the engagement of the latter at its conical surface with the co-operating inner surface of the sleeve 11. Preferably, means are provided for positively securing the cap 20 in the adjusted position. In the form shown in the drawing this locking means comprises spring loaded plungers 21a (one only being visible in the drawings) which project forwardly from the body 10 and engage in one or other of a number of holes (not visible) provided in the opposing surface of the cap 20.

To ensure return of the sleeve 11 as the hydraulic pressure is reduced, a spring 21 having a plurality of radially extending fingers is secured to the rear end of the sleeve 11 by an annular nut 22 with the fingers in engagement with the chuck body 10, this spring 21 being flexed as the sleeve 11 moves forward. This spring 21 can also be used for the secondary purpose of providing initial loading of the hydraulic fluid by drawing the sleeve 11 rearwardly after filling the liquid chamber, in order to compress the liquid to a predetermined degree when the plunger 15 is at its outermost position.

As already referred to above, various means may be employed for pressing in one or more plungers, and Figure 4 shows a modified form of the previously described construction in which movement of the plungers is effected by a lever-operated cam sleeve 30. This cam sleeve 30 has a bevelled face 30a on its inner rearwardly-facing edge and as the sleeve 30 is moved rearwardly the bevelled face engages the cammed edge 31a of each of a plurality of plungers 31 (only one of which is shown) and moves them inwards.

The sleeve 30 may be moved rearwardly by engagement of a lever, a toggle-operated ring or the like (not shown) in the annular groove 30b. Other arrangements, not illustrated, are of course possible; for example a cam ring rotatable about the axis of the chuck may be used, cam contours formed on the inner surface of the ring engaging the plungers 31 and effecting the desired movement. To reduce friction, a roller or captive ball may be provided on the upper surface of each plunger to engage the cam surface. Retaining members 32 are secured to the chuck body 10' and engage a recess in each of the plungers 31 to limit their outward movement. In each construction a separate radial hole may be provided communicating with the fluid chamber for filling the chamber, this hole being provided with a screw plug.

It will be appreciated that many modifications of the above described constructions are possible, whilst retaining the principle of self-contained hydraulic operation and the advantages which result from such operation, for example the powerful grip obtainable, the relatively simple construction possible and the smoothness of operation.

It will be appreciated that the front portion of the sleeve 11, which has the inner surface of conical shape, could be formed as a separate member from the rear portion which provides the axial thrust, the two separate members abutting.

What I claim is:

1. A collet chuck comprising a chuck body, said body having a central bore therein, a hollow sleeve in said bore, said hollow sleeve having an inner surface and an outer surface, part of said outer surface being in contact with said bore and said hollow sleeve being axially movable in said bore, part at least of the inner surface of said hollow sleeve being tapered, a collet, said collet having an outer surface which is tapered and bears against the tapered part of the inner surface of said hollow sleeve, stop means removably secured to said chuck body for preventing forward movement of said collet, a part of the wall of said bore being recessed, liquid contained in the space bounded by the recessed wall and said sleeve, a portion of the sleeve which is contacted by liquid lying in a plane perpendicular to the longitudinal axis of said bore and an axially movable plunger, said plunger projecting into said recess whereby axial movement of said plunger applies liquid pressure to the portion of the sleeve which lies in said perpendicular plane to effect movement of the sleeve in said bore.

2. A collet chuck comprising a chuck body, said body having a central bore therein of circular cross section, a hollow sleeve having inner and outer surfaces, part at least of the inner surface of said sleeve being tapered, a collet, the bore of said collet being variable over a wide range, said collet having an outer surface which is tapered in like manner to the inner surface of said sleeve, the outer surface of said collet being in engagement with the tapered surface of said sleeve, a cap, said cap having a screw threaded portion, a screw threaded portion on said chuck body which engages the screw threaded portion of said cap to secure said cap on the front of said chuck body, said cap having an inner face which engages said collet for preventing forward movement of said collet, said central bore being in contact with each end of the outer surface of said hollow sleeve, the space between the central bore and the intermediate portion of the outer surface of said hollow sleeve being filled with liquid, and an axially movable plunger, said plunger projecting into said liquid, a part of the intermediate portion of the outer surface of the hollow sleeve lying in a plane perpendicular to the longitudinal axis of said central bore whereby movement of said plunger into the liquid causes forward movement of said sleeve.

3. A chuck for holding a collet, comprising a chuck body, said body having a front face, a rear face and a central bore extending from the front face to the rear face, said central bore consisting of three co-axial portions, the diameter of the co-axial portion nearest said front face being greater than the diameter of the adjacent co-axial portion which is itself greater than that of the co-axial portion nearest said rear face, a hollow sleeve, said hollow sleeve having inner and outer surfaces, the outer surface of said hollow sleeve being in contact with the co-axial portion nearest to the front face and with the co-axial portion nearest to the rear face, the end of the inner surface of the sleeve nearer to the front face of said chuck body being flared in an outward direction, a collet, said collet having an outer surface bearing against the outwardly flared end of the inner surface of said sleeve, stop means removably attached to said chuck body, said collet having a front face engaging said stop means whereby forward movement of said collet is prevented, a part of the outer surface of said hollow sleeve adjacent the part which is in contact with the co-axial portion nearest to the front face lying in a plane at right angles to the longitudinal axis of the sleeve, the space enclosed between the intermediate co-axial portion of said central bore and the adjacent part of the outer surface of said hollow sleeve including the part of the outer surface lying in the said plane being filled with liquid, said chuck body having a further bore whose longitudinal axis is perpendicular to the longitudinal axis of said central bore, said further bore extending from the outer surface of said chuck body to the intermediate co-axial portion of said central bore, an axially movable plunger fitting in said further bore, said plunger being in contact with said liquid, and means for effecting axial movement of said plunger whereby the pressure applied to said liquid acts on the part of the outer surface of said hollow sleeve lying in the said plane to urge said hollow sleeve towards the front face of the chuck body and thereby close up said collet.

4. A chuck according to claim 3, further comprising a resilient member, said resilient member engaging said chuck body and being secured to that end of the hollow sleeve which is nearer to the rear face of the chuck body for opposing movement of said hollow sleeve towards the front face of the chuck body.

5. A chuck for holding a collet, comprising a chuck body, said body having a circular bore extending from front to rear of the body, said circular bore consisting of a first portion extending inwards from the front of the body, a second portion having a smaller diameter than that of said first portion extending inwards from the rear of the body, and a third portion intermediate said first and second portions and having a diameter less than that of the first portion but greater than that of the second portion, said chuck body having a further bore whose longitudinal axis is perpendicular to that of said circular bore and which extends from the outer surface of said chuck body to the third portion of said circular bore, a hollow sleeve, said hollow sleeve having an outer surface which has one portion of its length in contact with the first portion of said circular bore and a further portion of its length of which a part only is in contact with the second portion of said circular bore, the change in diameter between said one portion and said further portion of the outer surface of said hollow sleeve occurring abruptly, a plunger, said plunger being axially movable in said further bore, the third portion of said circular bore and the part of the further portion of said hollow sleeve which is not in contact with the circular bore, together with said plunger, forming the walls of a chamber which is filled with liquid, said sleeve having an inner surface which flares outwardly at the forward end of said sleeve, a collet, said collet having an outer surface of conical shape which bears against the outwardly flared inner surface of said sleeve, and a cap, said cap having a screw threaded portion, a screw threaded portion on said chuck body which engages the screw threaded portion of said cap to secure said cap on the front of said chuck body, said cap having an inner face which engages said collet for preventing forward movement of said collet.

6. A chuck acording to claim 5, further comprising a rotary plunger-operating member, said plunger operating member being rotatably mounted in said further bore and having a screw-threaded stem, said plunger having a screw-threaded bore in threaded engagement with said stem.

7. A chuck according to claim 5, further comprising a plurality of liquid sealing members, each sealing member being positioned in the third position of the circular bore, each sealing member being annular and channel-shaped in cross-section.

8. A chuck according to claim 5, further comprising a resilient member, said resilient member engaging said chuck body and being secured to that end of the hollow sleeve which is nearer to the rear face of the chuck body for opposing movement of said hollow sleeve towards the front face of the chuck body.

References Cited in the file of this patent

UNITED STATES PATENTS

| | | |
|---|---|---|
| 2,671,666 | Hall | Mar. 9, 1954 |
| 2,788,979 | Skillin | Apr. 16, 1957 |
| 2,826,420 | Klingler | Mar. 11, 1958 |
| 2,873,121 | Hahn | Feb. 10, 1959 |